United States Patent Office 3,471,571
Patented Oct. 7, 1969

3,471,571
PROCESS FOR PREPARING TRANS ISOMERS OF 1,2-BIS(ALKYLSULFONYL) ETHENE
Allan M. Harvey, Glen Ave., Norwalk, Conn. 06850
No Drawing. Continuation-in-part of application Ser. No. 491,445, Sept. 29, 1965. This application Dec. 26, 1967, Ser. No. 693,061
Int. Cl. C07c *161/00, 147/00*
U.S. Cl. 260—607                    9 Claims

ABSTRACT OF THE DISCLOSURE

The preparation of the trans isomers of 1,2-bis(alkylsulfonyl) ethenes having up to 12 carbon atoms in the alkyl group. These compounds are separated by oxidizing a corresponding cis-1,2-bis(alkylmercapto) ethene in the presence of hydrogen chloride in a solvent medium containing water or a mixture of water and an organic solvent selected from the group consisting of dioxane and at least one low molecular weight monohydric alcohol having from 1 to 6 carbon atoms.

---

This invention is directed to the trans isomers of alkylsulfonylalkylenes. More specifically, the invention concerns a process for the preparation of trans 1,2-bis (alkylsulfonyl) ethenes, which have the following formula:

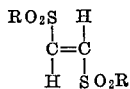

wherein R is an alkyl group having from 1 to 12 carbon atoms. This application is a continuation-in-part of application Ser. No. 491,445 filed Sept. 29, 1965.

The lower 1,2-bis(alkylsulfonyl) ethenes have proven to be effective fungicides. In most instances the trans isomer of such compounds has been found to possess greater fungicidal activity than the cis isomer and is therefore a highly desirable product.

Most synthetic methods of preparing bis-alkylsulfonyl ethenes result in products that are either entirely of cis configuration, or mixtures of cis and trans configurations containing predominantly cis isomers. Existing methods of isomerization to the predominantly trans bis-alkylsulfonyl ethenes are costly, time-consuming, and inefficient. It is known that trans (alkylsulfonyl) ethenes can be prepared by oxidizing a suitable cis(alkylmercapto) ethene to the corresponding sulfonyl compound and subsequently isomerizing the cis isomer to the trans isomer by irradiating a solution of the cis isomer with ultraviolet light in the presence of bromine. Such a process is disadvantageous due to the expense involved in the use of special solvents such as halogenated hydrocarbon solvents and more particularly due to the difficulties and prohibitive costs involved in carrying out photochemical reactions on a production scale.

It is an object of the invention to provide a process for producing trans-1,2-bis(alkylsulfonyl) ethenes from cis-1,2-bis(alkylmercapto) ethenes.

A further object of the invention is to provide a simplified method for preparing trans isomers of 1,2-bis(alkylsulfony) ethenes which can be carried out without separation and purification of intermediate products resulting from the reaction of cis-dichloroethene or vinylidene chloride with an alkyl mercaptan.

It is still another object of the invention to provide a practical process for preparing trans-1,2-bis(alkylsulfonyl) ethenes that does not involve photochemical reactions.

These and other related objects are achieved by a process which comprises oxidizing cis-1,2-bis(alkylmercapto) ethene to the corresponding sulfonyl compound and substantially simultaneously isomerizing the cis isomer to the trans isomer.

Alkylmercaptoethenes can be prepared by heating an alkali metal alkylmercaptide having from 1 to 12 carbon atoms in the alkyl group with an ethylenic compound, such as cis-1,2-dichloroethene or vinylidene chloride, in an alcoholic solution with an excess of alkali metal hydroxide. Suitable alkyl mercaptans which may be employed to provide alkyl mercaptides include methylmercaptan, ethylmercaptan, n-propylmercaptan, isopropylmercaptan, butylmercaptan, pentylmercaptan, hexylmercaptan, heptylmercaptan, octylmercaptan, nonylmercaptan, decylmercaptan, undecylmercaptan, dodecylmercaptan, and the like.

The oxidation of alkylmercaptoethenes and the conversion of the cis isomer to the trans isomer is then carried out in the presence of an oxidizing agent and hydrochloric acid. When hydrochloric acid is present during at least a substantial portion of the oxidation of the alkylmercaptoethene, the resulting 1,2-bis(alkylsulfonyl) ethene is substantially completely in the trans form. It is believed that the isomerization occurs at a stage which is intermediate between the start and the completion of the oxidation reaction.

The mechanism of the formation of the trans isomer during oxidation is not fully understood. In this connection, it is noted that neither diluted nor concentrated hydrochloric acid alone will change the cis-1,2-bis-(alkylmercapto) ethene to the trans isomer to any significant degree even at up to temperatures of 100° C. in alcohol or aqueous media. Moreover, hydrochloric acid does not isomerize cis-1,2-bis(alkylsulfonyl) ethene to any significant extent in such media at temperatures up to 100° C. It has also been found that, whereas oxidation of cis-1,2-bis-(n-propylmercapto) ethene with hydrogen peroxide or peracetic acid produced a product containing only about 10 percent of the trans isomer, oxidation in the presence of hydrochloric acid provided a product which was substantially 100 percent trans-1,2-bis(n-propylsulfonyl) ethene.

Complete conversion of the cis isomer to the trans isomer by the process of this invention is not dependent on the relative proportions of the cis and trans isomers present in the intermediate material, i.e., the alkylmercaptoethene. It is apparent therefore that the process of this invention provides a convenient and efficient method for converting a composition consisting essentially of cis isomer of an alkyl mercaptoethene to a composition consisting essentially of the trans isomer of an oxidized alkylmercaptoethene.

The oxidation-isomerization reaction is carried out in a reaction medium consisting of water or a mixture of water and some suitable organic solvent, such as dioxane, or one or more low molecular weight monohydric alcohols having from one to six carbon atoms and mixtures of these materials. Suitable alcohols include methanol, ethanol, n-propanol, butanol, n-pentanol, n-hexanol, and the like.

A preferred group of solvents suitable for use in the process is the aforementioned water-monohydric alcohol mixtures. These materials ore preferred since they are suitable for use as a reaction medium for the preparation of alkylmercaptoethenes as hereinbefore described. It will be appreciated that by employing such materials the overall preparation of trans-1,2-bis(alkylsulfonyl) ethenes is substantially facilitated inasmuch as the same reaction medium is employed throughout and there is no need for the isolation and purification of intermediate products. Moreover, it has been found that lower reaction temperatures can be used with the alcoholic reaction media than can be used when water alone is employed. For example, when the reaction is carried out in water alone there is an induction period before oxidation of the mercaptoethene begins. Temperatures of at least about 75° C. and preferably about 80° C. are necessary in order to initiate the reaction. Once initiated the reaction may proceed vigorously. The use of water-alcohol mixtures moderates the reaction and allows the reaction to begin at lower temperatures without an induction period.

As to the relative amounts of water and alcohol or dioxane which may be employed, in general, sufficient water must be present in order to provide proper utilization of the oxidizing agents, catalysts, and other water-soluble reactants. For example, it has been found that wasteful decomposition of hydrogen peroxide occurs in the presence of concentrated hydrochloric acid. Therefore, it is necesary to employ the hydrogen peroxide in a compatible mixture with hydrochloric acid, i.e., one which contains sufficient water to provide a stable mixture of hydrogen peroxide and hydrochloric acid. The amount of water which must be present can be conveniently referred to as an effective amount, i.e., an amount which is sufficient to afford efficient functioning of the reaction system by avoiding premature decomposition of reactants, particularly hydrogen peroxide, which may occur in the presence of concentrated hydrochloric acid. In general the concentration of hydrogen chloride in an optimum oxidizing mixture should not exceed obout 9 weight percent of the total amount of water in the reaction medium. The preferred ratio of water to organic solvent is about 1 to 1 by weight.

When the oxidation-isomerization reaction is carried out in a mixture of water and an immiscible solvent, e.g., pentanol, hexonol, and the like, a compatible surface active agent may be employed to facilitate dispersion of the reactants in the reaction medium. It will be appreciated that in situations where water-immiscible liquids are employed in conjunction with a water-containing reaction environment a substantial degree of agitation will be required in order to insure effective mixing of the various reactants, catalysts, and agents, and also to avoid local overheating and subsequent local decomposition of oxidizing agents.

The oxidation and isomerization reactions are carried out at a temperature from about 25° C. to about 90° C. and preferably about 50° C. to about 85° C. The optimum temperature range for alcohol-water reaction media is from about 50° C. to about 85° C., preferably about 65° C. For a water reaction medium the optimum temperature range is from about 75° C. to about 90° C., preferably about 80° C. It will be appreciated that the use of low boiling mixtures of alcohols or alcohol and water may require that the reaction be carried out under pressure in order to reduce solvent loss. For this reason, alcoholic reaction media comprising alcohols such as n-propanol, n-pentanol, and n-hexanol are preferred. The rate of reaction may be increased by holding the reaction mixture at higher temperatures within the above ranges after the addition of hydrochloric acid and oxidizing agent has been completed.

Oxidizing agents which are suitable for use in providing 1,2-bis(alkylsulfonyl) ethenes by oxidation of the corresponding alkylmercaptoethenes include those oxidizing agents which are capable of oxidizing mercaptoethenes to sulfones, for example, hydrogen peroxide, peracetic acid, chromic acid, sodium hypochlorite, nitric acid, potassium permaganate, benzoyl peroxide, and the like. These oxidizing ogents are employed in "oxidizing amounts," i.e., in amounts which are effective to oxidize substantially all the mercapto compound to the corresponding sulfonyl compound. In general, the oxidizing agent is employed in stoichiometric quantities with respect to the total number of moles of mercapto compound to be oxidized. Optimum results with hydrogen peroxide are obtained with about a 20 percent excess over and obove the stoichiometric amount required to oxidize all the mercapto compound present. When the reaction is carried out at a lower temperature, for example, in a water-alcohol reaction medium, equivalent optimum results can be obtained with less than a 20 percent excess due to the reduced amount of decomposition of the oxidizing agent under these conditions.

Optionally, oxidization of the alkylmercaptoethenes may be facilitated through the use of conventional oxidation catalysts such as ammonium molybdate, molybdenum trioxide, ammonium vanadate, sodium tungstate, and the like.

Isomerization is dependent, at least in part, on the presence in the reaction system of hydrochloric acid before oxidation to the sulfonyl compound is complete. In an aqueous reaction system the hydrochloric acid is introduced prior to or simultaneously with the oxidizing agent. In alcohol-water systems the hydrochloric acid can be added after the addition of the oxidizing agent has been completed.

Hydrochloric acid which functions as an isomerization agent is employed in effective amounts, i.e., in amounts which are sufficient to achieve the desired conversion of the cis form of the alkyl mercapto compound to the trans form of the corresponding alkylsulfonyl compound under the reaction conditions which are employed.

The mole ratio of hydrogen chloride to mercaptoethene can range from about 0.2:1 to about 3:1 and preferably is about 1.4:1. At low ratios of hydrogen chloride to mercaptoethane it is preferred to avoid addition of supplementary amounts of water other than that supplied with the reactants, e.g., the hydrochloric acid and the oxidizing agent. The less water added with the reactants, the more rapid and complete the reaction will be.

The initial concentration of hydrogen chloride in the reaction medium at the start of the reaction can range from about 4.5 to about 10 weight percent, based on the total amount of water present in the reaction medium. It will be appreciated that when the oxidizing agent liberates water during reaction e.g., hydrogen peroxide, the concentration of hydrogen chloride and the reaction mixture will be diminished by dilution. In the case of an initial concentration of about 4.6 weight percent hydrogen chloride the final concentration may be as low as about 3 percent by weight due to the additional quantity of water liberated during the oxidation reaction.

In an optimum oxidizing mixture comprising hydrochloric acid (about 38%), hydrogen peroxide (about 50%) and a minimum ratio of hydrogen chloride to mercapto compound the initial concentration of hydrogen chloride should be about 8.5 weight percent and the final concentration will be about 7.5 weight percent.

In general, the oxidizing agent can be added to the alkylmercaptoethene over a period of from about 5 minutes to about 3 hours. It is preferred to employ a time period of from about 30 to about 45 minutes. The reaction is generally complete within a period of about 24 hours. At least about 1 hour, and preferably about 2 to 3 hours, should be allowed for completion of the reaction.

When the oxidation-isomerization reaction is complete the resulting product mixture may be filtered with or without neutralization of the hydrochloric acid with an alkali metal hydroxide such as sodium or potassium hydroxide. The yield of trans-1,2-bis(alkylsulfonyl) ethene is not affected significantly whether or not the final reaction product mixture is neutralized before filtration. If it is desired to neutralize the excess acidity it is desirable to maintain the temperature of the mixture at a point below about 25° C.

Bis(alkylmercapto) ethenes which are suitable for use in the herein disclosed oxidation-isomerization process can be prepared by many known processes, for example, that disclosed by Levy et al. in the U.S. Patent 3,117,069, in which about 90 percent of the product formed is in the cis configuration. The process of this invention can be carried out directly on the unpurified reaction product mixture containing the (alkylmercapto) ethene. Alternatively, any by-products, e.g., potassium chloride can be removed by washing or filtering the alkylmercapto-containing mixture, or the alkylmercapto-ethene can be separated from the reaction media by distilling off the alcohol. If desired the thio-ether itself can be purified.

The following examples illustrate the principles and the practice of this invention and are intended to exemplify rather than limit the invention.

EXAMPLE 1

To a 500 milliliter flask there were added 19.55 grams (0.11 mole) of cis-1,2-bis(n-propylmercaptoethene), 0.15 gram ammonium molybdate, 0.5 gram concentrated hydrochloric acid (about 37%), 50 milliliters of water, and 0.25 gram Triton–X-100 (isooctyl phenyl polyethoxy ethanol). The mixture was heated to 80° C. and stirred vigorously while adding, over a period of 30 minutes, a solution containing 36.0 grams (0.53 mole) of 50% hydrogen peroxide, 25.0 grams concentrated hydrochloric acid and 73 milliliters water. During the addition the temperature was maintained at about 80° C. After addition was complete, the reaction mixture was stirred for about two hours at 80° C., then cooled to about 10° C. The white, crystalline product was filtered, washed with water, and dried to yield 19.1 grams of trans-1,2-bis(n-propylsulfonyl) ethene, M.P. 152–155° C.

EXAMPLE 2

To a 500 milliliter flask there were added 19.55 grams of cis-1,2-bis(n-propylmercapto) ethene in 77.2 grams of n-pentanol, 0.15 gram of ammonium molybdate, 2.5 milliliters of water, 0.5 gram of concentrated hydrochloric acid and 0.25 gram of Triton–X-100 (isooctyl phenyl polyethoxy ethanol). The mixture was heated to 65° C., and stirred vigorously while adding at constant temperature, over a period of 30 minutes, a solution containing 36 grams (0.53 mole) of 50% hydrogen peroxide, 15 grams concentrated hydrochloric acid, and 47 milliliters of water. The reaction mixture was stirred at this temperature (65° C.) for three hours after the peroxide addition was complete and then cooled to 10° C. The white, crystalline product after being filtered, washed with water, and dried, was found to yield 17.9 grams of trans-1,2-bis(n-propylsulfonyl) ethene, M.P. 153–156° C.

EXAMPLE 3

Cis-1,2-bis(n-butylmercapto) ethene was prepared according to the method outlined by Levy (U.S. 3,117,069) by reacting 22.3 grams (0.230 mole) of vinylidene chloride with potassium n-butyl mercaptide formed from 33.3 grams (0.534 mole) of 90% KOH and 40.7 grams (0.452 mole) of n-butyl mercaptan in 150 grams of n-pentanol. The resulting reaction mixture was washed twice with water to remove potassium chloride, transferred to a 1000 ml. flask and admixed with 0.3 gram of ammonium molybdate, 5 milliliters of water, 1.0 gram of 37% hydrochloric acid and 0.5 gram of Triton–X-100. The mixture was heated to 65° C., then stirred vigorously while adding, over a period of 60 minutes at constant temperature, a solution containing 72 grams (1.06 moles) of 50% hydrogen peroxide, 100 milliliters of water and 30 grams of 37% hydrochloric acid. After addition was complete, the reaction mixture was stirred at 65° C. for one hour, then cooled to 10° C. The white crysalline product after being filtered, washed with water, and dried was found to yield 37.8 grams of trans-1,2-bis(n-butyl sulfonyl) ethane, M.P. 140–147° C.

EXAMPLE 4

Cis-1,2-bis(n-amymercapto) ethene was prepared according to the method of Levy, supra, by reacting 10.6 grams of vinylidene chloride (0.11 mole) with potassium n-amylmercaptide formed by reacting 15.9 grams of 90% KOH (0.256 mole) and 22.4 grams of n-amylmercaptan (0.216 mole) in 71.5 grams of n-pentanol. The resulting mixture was washed twice with water to remove potassium chloride and then transferred to a 500 milliliter flask and admixed with 0.15 gram ammonium molybdate, 2.5 milliliters of water, 0.5 gram concentrated hydrochloric acid, and 0.25 gram Triton–X-100 (isooctyl phenyl polyethoxy ethanol). The mixture was heated to 65° C., and stirred vigorously while adding, over a period of 40 minutes, a solution containing 36 grams (0.53 mole) of 50% hydrogen peroxide, 15.0 grams of concentrated hydrochloric acid, and 47 milliliters of water while maintaining the temperature at 65° C. The reaction mixture was held at that temperature and stirred for three hours after the addition of peroxide was complete, then cooled to 10° C. The solid, white product after being filtered, washed with water, and dried, yielded 15.8 grams of trans-1,2-bis(n-amylsulfonyl) ethene, M.P. 118–124° C. White crystals melting at 124–128° C., were obtained by washing the crude product with ethyl ether.

*Analysis.*—Calculated for $C_{12}H_{24}S_2O_4$: C, 48.62%; H, 8.16%; S, 21.63%. Found.—average results for analysis of two samples are: C, 48.18%; H, 8.00%; S, 21.53%.

EXAMPLE 5

Cis-1,2-bis(n-octylmercapto) ethene was prepared according to the method of Levy, supra, by reacting 10.6 grams of vinylidene chloride (0.11 mole) with potassium n-octylmercaptide formed from 15.9 grams of 90% potassium hydroxide (0.256 mole) and 31.4 grams of n-octylmercaptan (0.216 mole) in 71.5 grams of n-pentanol. The resulting reaction mixture was washed twice with water to remove potassium chloride and transferred to a 500 milliliter flask and then admixed with 0.15 gram ammonium molybdate, 2.5 milliliters of water, 0.5 gram concentrated hydrochloric acid (37%), and 2.5 grams Triton-X-100 (isooctyl phenyl polyethoxy ethanol). The mixture was heated to 65° C. and stirred vigorously while adding, over a period of 40 minutes, a solution containing 36 grams (0.53 mole) of 50% hydrogen peroxide, 15 grams of concentrated hydrochloric acid, and 47 milliliters of water. The reaction mixture was stirred at this temperature for four hours after the addition was complete, then cooled to 10° C. The solid white product after being filtered, washed with water, and dried, yielded 11.3 grams of trans - 1,2 - bis(n - octylsulfonyl) ethene. Waxy white plates melting at 137–140° C. were obtained when the product was washed with ethyl ether.

*Analysis.*—Calculated for $C_{18}H_{36}S_2O_4$: C, 56.80%; H, 9.53%; S, 16.85%. Found: C, 56.58%; H, 9.45%; S, 16.71%.

EXAMPLE 6

To a 500 ml. flask were added 19.55 grams (0.11 mole) mole) of cis-1,2 - bis(n - propylmercapto) ethene, 77.25 grams of p-dioxane, 0.15 gram of ammonium molybdate, 2.5 ml. water and 0.5 gram of 37% hydrochloric acid. The mixture was heated to 65° C., then stirred vigorously while adding, over a period of 45 minutes and at constant temperature, a solution containing 36 grams (0.53 mole) of 50% hydrogen peroxide, 47 ml. water, and 15 grams of 37% hydrochloric acid. After addition was complete, the reaction mixture was stirred at 65° C. for 3 hours, then cooled to 10° C. The white, crystalline product was filtered, washed with water and dried, yielding 14.3 grams of trans-1,2-bis(n-propylsulfonyl) ethene, M.P. 155–157° C.

EXAMPLE 7

To a 500 ml. flask were added 19.55 grams (0.11 mole) of cis-1,2-bis(n-propylmercapto) ethene, 77.25 grams of n-propanol, 0.15 gram of ammonium molybdate, 2.5 ml. water, 0.5 gram of 37% hydrochloric acid, and 0.5 gram of Triton–X–100. The mixture was heated to 65° C., then stirred vigorously while adding, over a period of 45 minutes and at constant temperature, a solution containing 36 grams (0.53 mole) of 50% hydrogen peroxide, 47 ml. water and 15 grams of 37% hydrochloric acid. After addition was complete, the reaction mixture was stirred at 65° C. for 3 hours, then cooled to 10° C. The white, crystalline product after being filtered, washed with water and dried yielded 15.2 grams of trans-1,2-bis(n-propylsulfonyl) ethene, M.P. 154–158° C.

What is claimed is:

1. A process for preparing a trans-1,2-bis(alkylsulfonyl)ethene having from 1 to 12 carbon atoms in the alkyl group which comprises oxidizing corresponding cis-1,2-bis(alkylmercapto)ethene in the presence of hydrogen chloride in a solvent, selected from the group consisting of (1) water and (2) mixtures of water and at least one organic solvent selected from the group consisting of dioxane and the aliphatic monohydric alcohols having from 1 to 6 carbon atoms, at a temperature from about 25° C. to about 90° C., the ratio of hydrogen chloride to said mercapto ethene being from about 0.2:1 to about 3:1.

2. A process as defined in claim 1 wherein the initial concentration of hydrogen chloride is from about 4.5 to about 10 weight percent, based on the amount of water present at the start of the reaction.

3. A process as defined in claim 1 where water is the sole solvent and the reaction is conducted at a temperature from about 75° C. to about 90° C.

4. A process defined in claim 1 wherein the solvent is a mixture of water and an organic solvent selected from the group consisting of dioxane and lower aliphatic monohydric alcohols having from 1 to 6 carbon atoms and the reaction is conducted at a temperature from about 50° C. to about 85° C.

5. A process as defined in claim 4 wherein the ratio of water to organic solvent is about 1:1.

6. A process as defined in claim 5 wherein the organic solvent is n-pentanol.

7. A process as defined in claim 1 for preparing a trans-1,2-cis(alkylsulfonyl)ethenes having up to 12 carbon atoms in the alkyl group which comprises oxidizing a corresponding cis-1,2-bis(alkylmercapto)ethene in a hydrochloric acid solution, the ratio of hydrogen chloride to mercapto compound being from about 0.2:1 to about 3:1.

8. A process as defined in claim 7 for preparing a trans-1,2-bis(alkylsulfonyl)ethene having up to 12 carbon atoms in the alkyl group which comprises heating a corresponding cis-1,2-bis(alkylmercapto)ethene to a temperature of about 25° C. to about 90° C. in the presence of hydrogen chloride and an oxidizing agent capable of oxidizing the mercapto group in a reaction medium selected from the group consisting of (1) water and (2) mixtures of water and at least one organic solvent selected from the group consisting of dioxane and aliphatic monohydric alcohols having from 1 to 6 carbon atoms, the ratio of hydrogen chloride to mercapto ethene being from about 0.2:1 to about 3:1 and the initial concentration of hydrogen chloride being from about 4.5 to about 10 percent by weight based on the weight of water present.

9. A process as defined in claim 8 wherein the oxidizing agent is hydrogen peroxide.

References Cited

UNITED STATES PATENTS 3,418,101   12/1968   Bucholz et al. ____ 260—607 XR

CHARLES B. PARKER, Primary Examiner

D. R. PHILLIPS, Assistant Examiner

FO-1050
(5/69)

UNITED STATES PATENT OFFICE
CERTIFICATE OF CORRECTION

Patent No. 3,471,571      Dated Oct. 7, 1969

Inventor(s) Allan M. Harvey

It is certified that error appears in the above-identified patent and that said Letters Patent are hereby corrected as shown below:

Column 1, line 16,    "separated" should be --prepared--.

Column 1, line 64,    "bis(alkylsulfony)" should be --bis(alkylsulfonyl)--.

Column 2, line 64,    "ore" should be --are--.

Column 3, line 30,    "obout" should be --about--.

Column 3, line 36,    "hexonol" should be --hexanol--.

Column 3, line 69,    "permaganate" should be --permanganate--.

Column 3, line 70,    "ogents" should be --agents--.

Column 4, line 3,    "obove" should be --above--.

Column 4, line 32,    "mercaptochloroethane" should be --mercaptochloroethene--.

Column 5, line 75,    "ethane" should be --ethene--.

Column 6, line 59,    delete "mole)".

Column 7, line 23,    before "ratio" insert --molar--.

Column 8, line 1,    before "ratio" insert --weight--.

Column 8, line 6    "trans-1,2-cis(alkylsulfonyl)ethenes" should be --trans-1,2-bis(alkylsulfonyl)-ethene--.

Column 8, lines 9 and 23, each instance, before "ratio" insert --molar--.

SIGNED AND SEALED

MAY 26 1970

(SEAL)
Attest:

Edward M. Fletcher, Jr.
Attesting Officer

WILLIAM E. SCHUYLER, JR.
Commissioner of Patents